June 4, 1968  C. SAVIN ET AL  3,386,190

DEVICE AND METHOD FOR DEMONSTRATING THE AREA OF A CIRCLE

Filed Oct. 22, 1965

INVENTORS
CORNELIUS SAVIN
ALAN G. VORWALD
CHRISTOPHER R. VAGTS
BY

ATTORNEYS

United States Patent Office 3,386,190
Patented June 4, 1968

3,386,190
DEVICE AND METHOD FOR DEMONSTRATING
THE AREA OF A CIRCLE
Cornelius Savin, Westbury, Alan G. Vorwald, Bethpage, and Christopher R. Vagts, Huntington, N.Y., assignors to Antran Corporation, a corporation of New York
Filed Oct. 22, 1965, Ser. No. 500,779
11 Claims. (Cl. 35—24)

ABSTRACT OF THE DISCLOSURE

An animated transparency device and method for demonstrating visually the characteristics and area of a circle comprising a circular member, a square grid member adapted to be disposed under a quadrant of said circular member and a rotatable arm member pivotally attached to said circular member centrally thereof, said rotatable member having a plurality of holes arranged therealong in which a marking instrument is adapted to be inserted for inscribing circles on said circular member, all of said members being made of a transparent material of identifying and contrasting colors adapted to be projected on a screen by an overhead projector.

---

Figure 1:
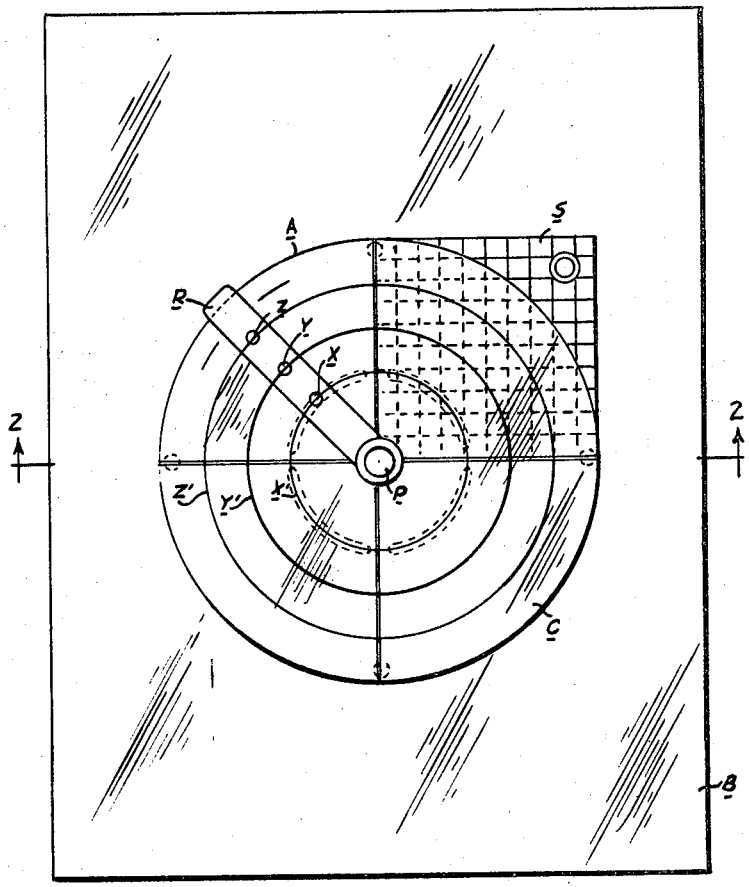

This invention relates to a device for visual presentation to large groups of students at one time by overhead projection of a transparent device, and more particularly, to an animated transparency device for and method of teaching mathematical concepts, especially in geometry, by use thereof.

Oftentimes it is difficult for a student especially if he is lacking in imaginative power to grasp the significance of mere drawn lines and their proposed super-position upon each other especially, for example, where geometric concepts are to be developed in relation to the circle, its characteristics, and measurement. The student's mind can often be helped if such circles, lines, angles, etc. can be represented in a tangible form. In order to overcome this disadvantage, a device is provided, in accordance with the present invention, whereby circles, lines, angles, etc. of various types are represented in concrete form and the parts of the device manipulated in order to illustrate many of the elementary geometrical terms and processes employed in making proofs necessary in this branch of mathematical science.

While various devices and methods have been heretofore suggested and used for teaching or training large groups by means of overhead projection of transparent devices, they were not entirely satisfactory. One such device heretofore suggested employed a so-called "still" transparency. Such "still" transparency devices are merely two-dimensional, while animated transparencies are tri-dimensional which is a decided advantage. Animation imparts a lively and more significant movement to the transparency and is much more easily understood. The modern method of teaching tends toward visualizing, manipulating and direct observation which is a decided advantage of teaching by animated transparencies. The inadequacies of these and other existing teaching means and methods is overcome by the present invention.

It is the general object of the present invention to provide animated teaching devices that overcome the insufficiencies of models, facsimiles, cut-away units and other means that have been previously employed to represent circles, angles, etc. for the purpose of teaching students and others.

It is another object of the invention to provide animated teaching devices of such character that each of the several components or parts of the assembly are readily visible and the relative movements of the related parts are all readily visible and understood. The several parts, or at least some of them, are constructed of transparent materials which are of different colors or shades for ready identification so that even though the parts are superimposed or positioned one within or behind the other, they are all immediately and readily recognizable and their several independent and mutual motions are clearly visible and understood.

It is a further object of this invention to provide a teaching aid of the animated transparency type which may be manipulated or actuated even by the student, himself, to observe the various components perform their respective functions and to solve the particular problem.

It is still another object of the present invention to provide animated transparency devices which are compact, light in weight and conveniently portable so as to facilitate handling, transporting, and storing of the devices.

It is still a further object of the invention to provide teaching devices of this type which are relatively inexpensive in their manufacture and which may be readily duplicated or produced in volume and, at the same time, efficient, effective and instructive in their use.

It is a most important object of the present invention to provide a method of and means for teaching mathematical concepts by the overhead projection of animated transparency devices which visually demonstrates the particular problem to be solved.

It is still a more specific object of this invention to provide a method of teaching the geometric concepts of the circle by overhead projection of an animated transparency device wherein a series of circles are inscribed on a circular configuration and the area of each circle determined visually and comparing the area of each of the circles with their respective radii by dividing the area of the circles with their respective radii squared so as to determine the value of Pi.

Various other objects and advantages of this invention will be more apparent in the course of the following specification, and will be particularly pointed out in the appended claims.

In the accompanying drawings, there is shown for the purpose of illustration, an embodiment which the invention may assume in practice.

Figure 2:
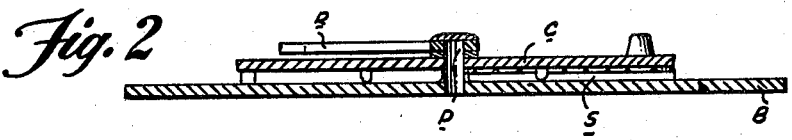
Figure 3:
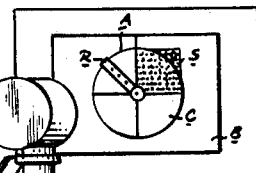
Figure 3:
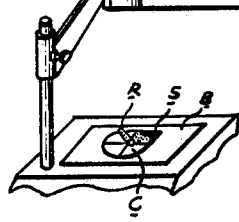

In these drawings:
FIG. 1 is a plan view of the animated transparency device in accordance with the present invention,
FIG. 2 is a sectional view taken on line 2—2 of FIG. 1, and
FIG. 3 is a perspective view of a portion of an overhead projector and screen used in connection with the visual demonstration of the animated transparency device of the present invention.

Referring more particularly to the drawings, the animated transparency device in accordance with the present invention consists of three parts, preferably a clear transparent plastic planar base B having a colored circular configuration, or member C arranged thereon, a removable transparent plastic grid square S, and a rotatable member R which is adapted to serve as a compass in a manner to be hereinafter described.

One end of the rotatable member R is pivotally attached to the center of the base B, as at P, and the free end thereof extends outwardly, preferably over the edge of the circular configuration C. There is arranged in this rotatable member a series of holes, three in the present instance, as indicated at (X, Y and Z).

The grid square S is divided into one hundred squares or units which provide ten units along each side. In the present instance, the hole X in the rotatable member R is positioned from the center P a distance equal to four units of the square, the hole Y a distance equal to six units and the hole Z a distance equal to eight units with the radius of the circular configuration C being equal to ten units, and being designed as A.

Having described the parts and construction of the animated transparency device of the present invention, it functions and is used in the following manner.

The device is positioned, as shown in FIG. 3, on an overhead projector stage with parts thereof satisfactorily focused on a screen in a well known manner. The grid square S is then positioned on base B in under the circular configuration C, as clearly shown in FIGS. 1 and 3, with two adjacent sides being in alignment with the radii of the circular configuration so that ten squares or units are positioned therealong. Hence, it will be seen that the square S is disposed in under a full quadrant of the circular configuration.

The device is now in readiness for the instructor to demonstrate visually the problem to the student body. The area of the grid square S is first calculated by demonstrating visually to the students that this square is ten by ten, thus containing one hundred square units ($10 \times 10 = 100$) and that the two sides of the square are on the radii of the circle so that R equals 10 and $R^2$ equals 100.

The approximate area of the circle configuration C is then calculated by counting the number of square units in the circle A configuration in the quadrant opposite the square S, preferably by marking on the circular member opposite each square unit with a dot using a suitable pen or pencil and including in the count those squares that are half or more than half inside the circular configuration. Then multiply the number of square units counted in the quadrant by four and the result will obviously be the approximate area of the circular configuration.

The area of this circular configuration is then compared with the area of the square on the radius by dividing the area calculated by the radius squared $$\frac{A}{R^2} = \frac{316}{100} = 3.16$$

This result is then recorded preferably in a manner hereinafter set forth.

A suitable pen is then inserted in each of the holes X, Y and Z of the rotatable compass member R and a circle inscribed on the circular member C so as to provide circles X', Y' and Z'. As a result, it will be seen that there is provided circles X', Y' and Z' having a radii of 4, 6 and 8 units from the center P.

The approximate area of each of these circles is calculated as previously described and compared with their respective radii and the results preferably tabulated as follows:

| Radius (R) (units) | Area of Square on Radius ($R^2$) (sq. units) | Area of Quarter Circle (¼ A) | Area of Circle (A) | Ratio ($A/R^2$) |
|---|---|---|---|---|
| A—10 | 100 | 79 | 316 | 316/100=3.16 |
| X—4 | 16 | 13 | 52 | 52/16=3.25 |
| Y—6 | 36 | 28 | 112 | 112/36=3.11 |
| Z—8 | 64 | 51 | 204 | 204/64=3.18 |

The results in the above table are then analyzed for patterns and it will be observed that the area divided by the square of the radius ($A/R^2$) for each circle is slightly greater than three. Hence, it can then be stated that the area of any circle is slightly greater than three times the square of its radius or $A = (3+)(R^2)$.

The students can then be told that it has been found that mathematicians have calculated the value of the ratio ($A/R^2$) to hundreds of decimal places. The results being a constant Pi represented by $\pi$.

Thus, if $$\frac{A}{R^2} = \pi, \quad A = \pi R^2$$

It has been found that an approximation of Pi or $\pi$ is 3.14 and this value can then be compared with those obtained as explained hereinbefore experimentally and tabulated in the above table.

As a result it will be seen that the animated transparency device in accordance with the present invention can be used to demonstrate visually the direct measurement of the approximate area of a circle, deriving the formula for the area of a circle, and for determing experimentally the value for Pi.

While there is shown and described an embodiment which the invention may asume in practice, it wil be understood that this embodiment is merely for the purpose of illustration and description, and that other forms can be devised within the scope of the invention as defined in the appended claims.

We claim:

1. An animated transperency device adapted to be used with an overhead projector for teaching geometry comprising a transparent planar base adapted to be positioned upon the stage of the projector, a circular member arranged on said base, a removable member adapted to be positioned on said base under said circular member so as to underlay a quadrant thereof, said removable member having ten squares on two of the adjacent sides thereof which sides are positioned in alignment with radii of said circle, and a rotatable member pivotally attached to the center of said circle which is adapted to serve as a compass for inscribing circles on said circular member and over said removable member, at least said rotatable member being movable relative to said base so as to demonstrate visually a geometric problem by projecting the base and members on a screen by means of the overhead projector.

2. An animated transparency device adapted to be used with an overhead projector for teaching geometry comprising a transparent planar base adapted to be positioned upon the stage of the projector, a circular member arranged on said base, a grid member adapted to be positioned on said base under said circular member so as to underlay a quadrant thereof, said grid member having one hundred squares so as to have ten squares on each side thereof with two sides adapted to be positioned in alignment with radii of said circle, and a rotatable member pivotally attached to the center of said circular member which is adapted to serve as a compass for inscribing circles on said circular member over said grid member, said rotatable member having a plurality of holes arranged therein in which a marking instrument is adapted to be inserted, at least said rotatable member being movable relative to said base so as to demonstrate visually a geometric problem by projecting the base and members on a screen by means of the overhead projector.

3. An animated transparency device adapted to be used with an overhead projector for teaching geometry or trigonometry comprising a transparent planar base adapted to be positioned upon the stage of the projector, a circular member arranged on said base having a known radius, a member adapted to be disposed under said circular member so as to underlay a quadrant thereof, said last member having one hundred squares so as to provide ten squares on each side thereof with two sides adapted to be positioned in alignment with radii of said circular member, and a member pivotally attached to the center of said circular member which is adapted to serve as a compass for inscribing circles on said circular member over said last member, each of said members being in identifying colors and being constructed of a transparent material, all of said members being movable relative to said base and adapted to demonstrate visually a geometric problem by projecting the base and members on a screen by means of the overhead projector.

4. An animated transparency device adapted to be used with an overhead projector for teaching geometry comprising a transparent planar base adapted to be positioned upon the stage of the projector, a circular member mounted on said base having a known radius, a removable grid square member adapted to be positioned on said base under said circular member so as to be disposed under a quadrant of the circular member, two adjacent sides of the square being in alignment with the radii of the circular member and with each side being equal to the radius of the circular member, said grid member having one hundred square units, and a removable arm-like member having one end thereof adapted to be pivotally attached to the center of said circular member with the free end thereof extending outwardly to at least the marginal edge of said circular member, said arm-like member being rotatable about its pivotal connection and having a plurality of holes arranged therein which is adapted to serve as a compass to form circles on said circular member, said circular, arm-like and square members being in identifying colors and being constructed of a transparent material, all of said members being movable relative to said base and adapted to demonstrate visually a geometric problem by projecting the base and members on a screen by means of the overhead projector.

5. An animated transperency device adapted to be used with an overhead projector for teaching geometry consisting of at least three members, a circular member having a known radius and which is adapted to be positioned upon the stage of the projector, a removable member having at least two sides arranged at right angles to one another, said movable member adapted to be disposed under said circular member so as to underlay a quadrant thereof and so that the sides are in alignment with the radii of said circular member, the removable member having arranged thereon one hundred squares covering the quadrant so that ten squares are arranged along each of the two sides thereof, and a rotatable member having one end thereof pivotally attached to said circular member and which is adapted to serve as a compass to inscribe circles on said circular member opposite said removable member, all of said members being movable relative to said base and adapted to demonstrate visually a geometric problem by projecting the base and members on a screen by means of the overhead projector.

6. An animated transparency device, as defined in claim 5, wherein the removable member is a square grid divided into one hundred squares with each side equal to the radius of the circular member.

7. An animated transparency device, as defined in claim 5, wherein there is arranged in the rotatable member a plurality of holes in each of which a marking instrument is adapted to be inserted for inscribing a circle or arc on said circular member opposite said removable member.

8. An animated transparency device, as defined in claim 5, wherein each of the members has an identifying color and is constructed of a transparent material.

9. The method of teaching the geometric concepts of the circle by overhead projection of an animated transparency device which comprises providing a circular configuration of known radius on a transparent planar base which is adapted to be positioned upon the stage of the projector, providing square means for calculating the approximate area of a quadrant of the circular configuration with two adjacent sides of the square means disposed in alignment with the radii of said circular member, projecting said circular configuration and said square means positioned thereon on a screen by means of an overhead projector so as to demonstrate visually the area of the circular configuration, multiplying the area of the quadrant by four so as to determine the approximate area of the circle configuration, and comparing the area of the circle configuration with the area of the square on the radius by dividing the area of the circular configuration by the square of the radius.

10. The method of teaching the geometric concepts of the circle by overhead projection of an animated transparency device which comprises providing a circular configuration on a transparent planar base which is adapted to be positioned on the stage of the projector, providing a removable grid square member divided into one hundred squares with ten along each side, positioning the square member in under a quadrant of said circular configuration so that two adjacent sides thereof are in alignment with the radii of said circular configuration, providing a rotatable arm-like member on said circular member which is pivotally attached to said circular member at the center thereof and having a plurality of holes arranged therein, inserting a marking instrument into any one of said holes and inscribing a circle on said circular member so as to be disposed over the quadrant opposite said square member, projecting all of said members positioned one on top of the other on said base on a screen by means of an overhead projector so as to demonstrate visually the area of the circle, calculating the approximate area of that quadrant of the circle by counting the number of squares in the quadrant opposite said square member including in the count those squares which are half or more than half inside the circle, multiplying this count by four, the result being the approximate area of the circle inscribed, and finally comparing the area of the circle with the area of the square on the radius by dividing the area of the circle by the square of the radius.

11. The method of teaching the geometric concepts of the circle by overhead projection of an animated transparency device which comprises providing a circular configuration on a transparent planar base which is adapted to be positioned upon the stage of the projector, providing a removable grid square member divided into one hundred squares with ten along each side, positioning the square member in under a quadrant of said circular configuration so that two adjacent sides thereof are in alignment with the radii of said circular configuration, providing a rotatable arm-like member which is pivotally attached to said circular member at the center thereof and having a plurality of holes arranged therein, projecting all of said members positioned one on top of the other on said base on a screen by means of an overhead projector so as to demonstrate visually the area of the circle, inserting a marking instrument into each of said holes and inscribing a series of circles of a known radii on said circular member so as to be disposed over the quadrant opposite said square member, calculating the approximate area of each of the circles over said quadrant by counting the number of squares in the quadrant opposite said square member including in the count those squares which are half or more than half inside the respective circle, multiplying the squares in one quarter of each circle by four so as to determine the approximate area of each of the circles, and finally comparing the area of each of the circles with the area of the square on the respective radii by dividing the area of the respective circles by the square of the respective radii.

References Cited

UNITED STATES PATENTS

| | | | |
|---|---|---|---|
| 1,310,547 | 7/1919 | Sanborn | 33—98 |
| 2,054,420 | 9/1936 | Hochman | 33—27 |
| 2,465,481 | 3/1949 | Reiche | 33—98 X |
| 2,841,889 | 7/1958 | Coale et al. | 35—39 |

FOREIGN PATENTS

| | | |
|---|---|---|
| 755 | 1886 | Great Britain. |

EUGENE R. CAPOZIO, *Primary Examiner.*

W. H. GRIEB, *Examiner.*